United States Patent
Peron et al.

(10) Patent No.: US 12,088,235 B2
(45) Date of Patent: Sep. 10, 2024

(54) SYSTEM TO DETERMINE A PERIOD FOR WARMING UP OF A POWER CONVERTER AND RELATED METHODS

(71) Applicant: General Electric Renovables Espana, S.L., Barcelona (ES)

(72) Inventors: Virginie Peron, Nantes (FR); Thomas Jean Picard, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 59 days.

(21) Appl. No.: 17/968,295

(22) Filed: Oct. 18, 2022

(65) Prior Publication Data

US 2023/0132246 A1    Apr. 27, 2023

(30) Foreign Application Priority Data

Oct. 22, 2021  (EP) ..................... 21382955

(51) Int. Cl.
*H02P 9/00* (2006.01)
*H02P 101/15* (2016.01)

(52) U.S. Cl.
CPC .......... *H02P 9/007* (2013.01); *H02P 2101/15* (2015.01)

(58) Field of Classification Search
CPC ................. H02P 9/007; H02P 2101/15; F05B 2270/303; F05B 2270/323; F05B 2270/325; Y02E 10/72; Y02E 10/76; F03D 7/026; F03D 80/60; F03D 80/82
See application file for complete search history.

(56) References Cited

U.S. PATENT DOCUMENTS

| | | | |
|---|---|---|---|
| 9,621,088 B2 | 4/2017 | Niemoeller et al. | |
| 10,428,803 B2 | 10/2019 | Lund | |
| 11,258,386 B2 | 2/2022 | Maksimainen et al. | |
| 2015/0244297 A1* | 8/2015 | Niemoeller | H02P 9/08 290/44 |

FOREIGN PATENT DOCUMENTS

| | | |
|---|---|---|
| CN | 105514838 B | 10/2017 |
| EP | 3236064 B1 | 8/2018 |
| EP | 2913520 A1 | 11/2020 |
| EP | 3869030 A1 | 8/2021 |

OTHER PUBLICATIONS

European Search Report Corresponding to EP21382955 on Apr. 7, 2022.

* cited by examiner

*Primary Examiner* — Joseph Ortega
(74) *Attorney, Agent, or Firm* — Dority & Manning, P.A.

(57) ABSTRACT

The present disclosure relates to methods (300) to determine a duration of a period for warming up of a power converter (20) of a wind turbine (1). The method (300) comprises determining (301) a first indicator that is indicative of a time that the power converter (20) has been inactive. Further, the method (300) comprises determining (302) the period for warming up at least partially based on the first indicator. A power converter assembly is also disclosed.

17 Claims, 3 Drawing Sheets

Fig. 2
Prior Art

SYSTEM TO DETERMINE A PERIOD FOR WARMING UP OF A POWER CONVERTER AND RELATED METHODS

FIELD

The present disclosure relates to systems and methods for determining a period for warming up of a power converter of a wind turbine.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid. Further, wind turbines comprise a power converter to convert the power generated by the generator to make it compatible with the electrical grid.

When for any reason a wind turbine is stopped, for example due to a malfunction of the power supply or due to grid disturbances or in order to carry out maintenance, the amount of humidity in wind turbine components such as the wind turbine generator and the wind turbine power converter may not be controlled, and water condensation may happen in these components. This may be particularly relevant if the wind turbine is an offshore wind turbine.

Water condensation in the converter may create tracking surfaces to the ground, which may cause a ground fault if the electronics of the converter are not dried before restarting the generator. Similarly, full operating voltage and current can damage power semiconductors in the converters if these are operated at a certain temperature and humidity. Further, humidity absorption by insulation layers or dehumidifying devices may cause the absorbent material to delaminate due to rapid vapor expansion if these are operated normally, which in turn may degrade the insulation in the long term. Also, water absorption may significantly reduce the dielectric properties of the insulation. This may cause an electrical breakdown when initializing the power converter again without drying the insulation.

Therefore, in order to safely restart the power converter, the power converter may need to be heated and dried first. There are several methods to verify the state of the converter, such as for example performing a manual inspection to check whether the power converter is fit for restarting the wind turbine. This is a cumbersome task, moreover manual inspections may be rather difficult in offshore wind turbines due to accessibility limitations.

In such cases, a possible way to ensure that the converter is dry, and the wind turbine may be safely restarted, is for a warm fluid to be pumped through the converter during a certain time period. Such a period of time may for example be between 8 and 24 hours. Wind turbine operation will not start until a warm-up period has been completed. If the warm-up period is chosen too low, the restart of the converter may be unsafe. If the warm-up period is chosen too long, annual energy yield of a wind turbine may be unduly reduced. Examples of the present disclosure provide methods and systems for determining suitable warm-up periods for a converter.

SUMMARY

In a first aspect, a method for determining a period for warming up a power converter of a wind turbine is disclosed. The method comprises determining a first indicator that is indicative of a time that the power converter has been inactive. Further, the method also comprises determining the period for warming up at least partially based on the first indicator.

According to this first aspect, the method allows to determine an appropriate period for warming up depending on the time period the power converter has been inactive, without the need of carrying further measurements. This results in a considerable simple and robust method which does not depend on temperature or humidity sensors. Besides, this method allows to establish a period for warming up without performing visual inspections, which can be complex and time-consuming.

In another aspect, a power converter assembly is disclosed. The power converter assembly is configured to determine a duration of a period for warming up. The power converter comprises a processor configured to determine a first indicator of a time the power converter has been inactive. The processor is also configured to determine a period for warming up at least partially based on the first indicator.

According to this additional aspect, the power converter assembly may determine a period for warming up from a parameter that is easy to determine and robust, and do not rely on peripheral hardware. This also simplifies the assembly time of the power converter assembly and reduces the risk of potential malfunctioning.

Throughout this disclosure, the terms "power converter" and "converter" are interchangeably used. Further, it may be understood that the period for warming up (or warm-up period) may be a sequence of heating and/or drying processes. Thus, a warm-up period may comprise a unique period of time with a given heating process or multiple time periods with different heating and drying processes.

BRIEF DESCRIPTION OF THE DRAWINGS

Non-limiting examples of the present disclosure will be described in the following, with reference to the appended drawings, in which:

FIG. 2 illustrates a detailed, internal view of a nacelle of a wind turbine according to one example;

DETAILED DESCRIPTION OF EXAMPLES

In these figures the same reference signs have been used to designate matching elements.

Figure 1:
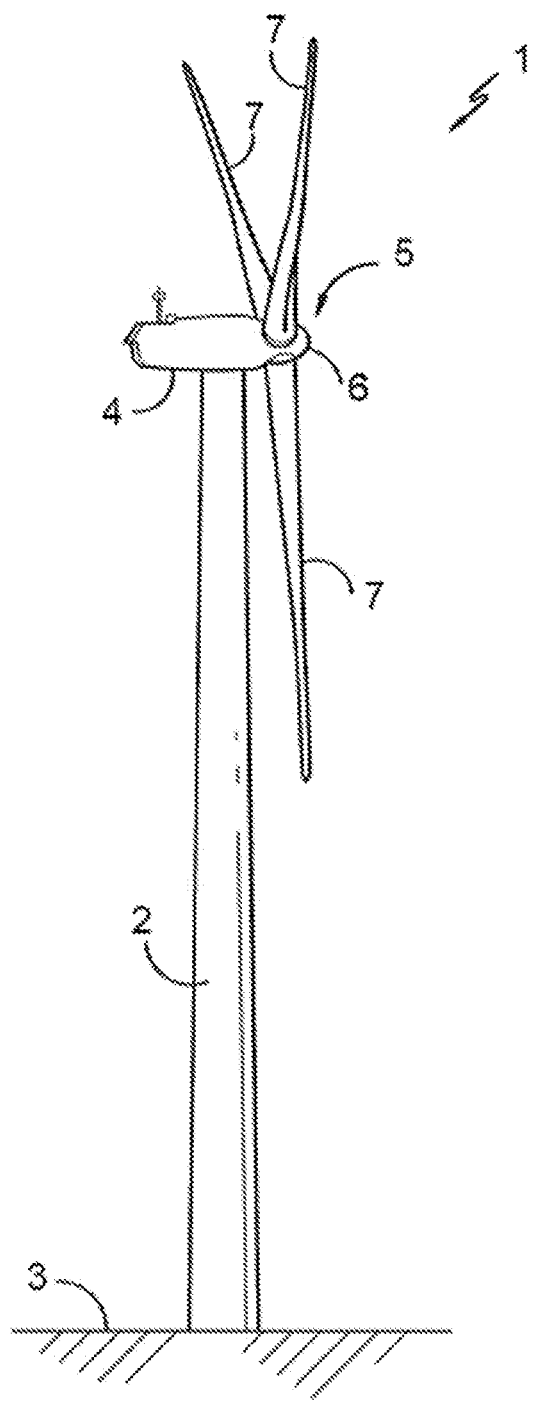
FIG. 1 illustrates a perspective view of a wind turbine according to one example.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. In this example, the wind turbine is an onshore wind turbine, in other examples it may be an offshore wind turbine.

Figure 2:
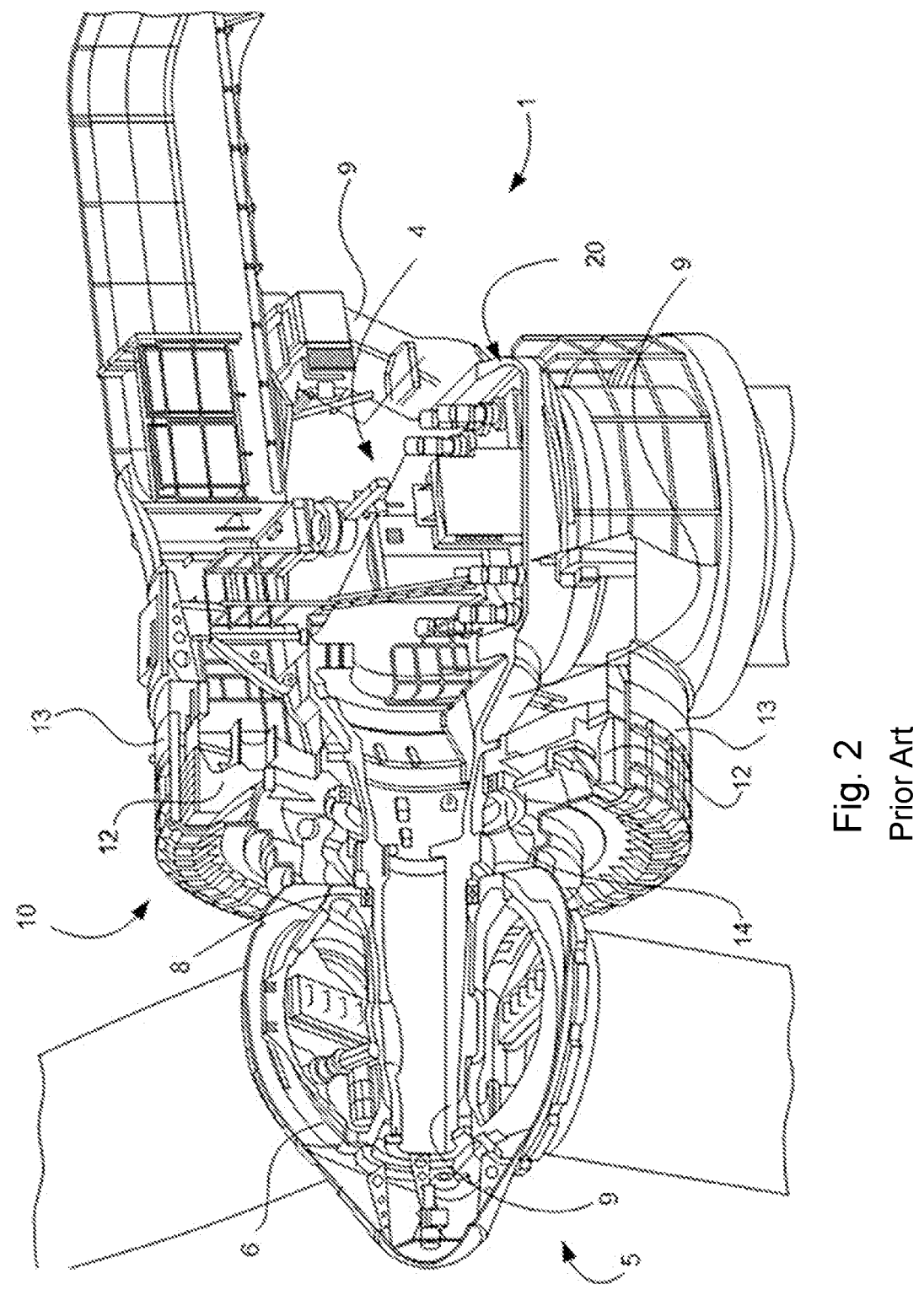

FIG. 2 illustrates a simplified, internal view of one example of a nacelle 4 of a direct drive wind turbine 1. As shown, the generator 10 may be disposed within the nacelle 4 or between the nacelle 4 and the rotor 5. In general, the generator 10 may be coupled to the rotor 5 of the wind turbine 1 for generating electrical power from the rotational energy generated by the rotor 5. For example, the rotor 5 of the wind turbine may include a hub 6 coupled to a rotor 12 of a generator 10 for rotation therewith. The rotation of the hub 6 may thus drive the rotor 12 of the generator 10.

In FIG. 2, the wind turbine rotor 5 may be rotatably mounted on a support frame 9 through two rotor bearings 8. In other examples, the support frame 9 may not extend through the hub 6 and therefore the rotor may be supported by a single rotor bearing 8, commonly called as the main bearing.

The generator 10 may comprise a rotor 12 and a stator 13. The stator may be rigidly mounted on the support frame 9. The rotor may be rotatably mounted on the stator through a generator bearing 14 so that the rotor may rotate with respect to the stator around an axis.

The generator 10 may be electrically coupled to the converter 20. The wind turbine converter 20 may adapt the output electrical power of the generator to the requirements of the electrical grid. In this example, the converter 20 is placed inside the nacelle 4, however, in other examples it may be placed in other locations of the wind turbine, e.g., in the top tower portion or in the bottom tower portion. In large offshore wind turbines, the converter may be a medium voltage converter, e.g., with a nominal voltage between 2 kV and 5 kV, for reducing electrical losses and expensive cables.

Figure 3:
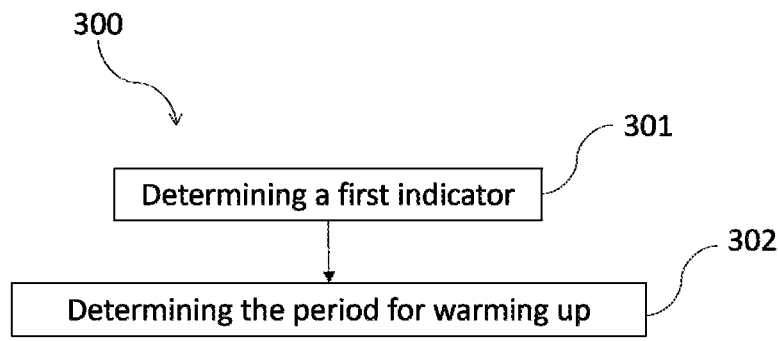
FIG. 3 is a flow diagram of an example method for determining a duration of a period for warming up a power converter.

FIG. 3 is a flow diagram of an exemplary method for determining a period for warming up a power converter of a wind turbine. The method 300, at block 301, comprises determining a first indicator that is indicative of a time that the power converter has been inactive. Further, the method 300, at block 302, comprises determining the period for warming up at least partially based on the first indicator. Warming up the power converter of the wind turbine may be performed by passing a warm liquid through the power converter for the determined warming up period.

In some examples, the determination of the first indicator may be based on a time wherein a cooling pump has been inactive. Thus, in situations wherein the power converter may have been inactive but the cooling pump or cooling system in charge of controlling the temperature (and humidity) of the power converter has been in continuous operation, the warm-up period may be reduced or cleared. The cooling pump may be connected to an auxiliary power supply and therefore a power converter shutdown does not necessarily imply that the cooling pump is inactive. In certain grid loss situations, the cooling pump may be shutdown together with the power converter, but it may recover power once an auxiliary power supply is connected. Thus, in additional examples, the first indicator may be determined based on a period of time between a point in time wherein an auxiliary generator has been turned on and a point in time wherein the wind turbine is connected back to a grid. In further examples, the first indicator may be determined by comparing a timestamp of a grid outage start with a timestamp of a grid outage end. The aforementioned comparison may be provided by a dedicated device such as a network failure detector or may be performed by other electronic component such as a processor of a power converter assembly, or others.

Further, a first value ($V_1$) for the warm-up period may be based on the first indicator. Additionally, the first value ($V_1$) may be selected from a plurality of discrete values based on the first indicator. More precisely, the first value ($V_1$) for the warm-up period may be zero when the first indicator is below a minimum threshold, i.e. when the first indicator of a time the power converter has been inactive is below 60 minutes. Other magnitudes for the minimum threshold such as 45 minutes, 75 minutes, or shorter, larger and intermediate times can also be implemented. Further, the first indicator may be based on any of the previous examples disclosed, such as for example, the time wherein the cooling pump has been inactive.

TABLE 1

Exemplary ranges of the first indicator and associated first values ($V_1$) for the warm-up period.

| First Indicator | First value ($V_1$) |
|---|---|
| ≤1 hour | 0 |
| >1 hour and ≤4 hours | 2 hours |
| >4 hours and ≤8 hours | 4 hours |
| >8 hours and ≤16 hours | 8 hours |
| >16 hours and ≤24 hours | 16 hours |
| >24 hours | 24 hours |

Similarly, a first non-zero discrete value for the warm-up period is determined when the first indicator is above a minimum threshold. In examples, as shown in table 1, the first non-zero discrete value may be 2 hours when the first indicator indicative of a time that the power converter has been inactive is greater than 60 minutes (1 hour). Besides, the plurality of non-zero discrete values for the warm-up period associated with the first indicator may change with increments in the first indicator. Thus, the first value ($V_1$) for the warm-up period may be 2 hours for indicator values between 1 and 4 hours, 4 hours for indicator values between 4 and 8 hours, and 8 hours for indicator values between 8 and 16 hours. Further, the plurality of discrete values for the period for warming up associated with the first indicator may comprise a maximum first value of 24 hours. The maximum warm-up period may be associated with a first indicator magnitude greater than 24 hours, i.e. a period of time wherein the cooling pump has been inactive greater than 24 hours, or others. In other examples, the duration of the warm-up period may double with constant increments in the first indicator, i.e. every 3 hour increment in the first indicator.

Additionally, the method 300 may further comprise determining a temperature of a coolant ($T_c$) of the power converter. The temperature of a coolant ($T_c$) may be determined by measuring the temperature of the coolant itself or by estimating the temperature based on another parameter, such as for example the temperature of a coolant conduit. The method 300 may also comprise determining the warm-up period at least partially based on the coolant temperature. Thus, the value for the warm-up period may be based on an absolute value of the determined coolant temperature ($T_c$). Further, the method 300 may comprise estimating a dew point ($D_p$) and determining the warm-up period at least partially based on a difference between the coolant temperature ($T_c$) and the estimated dew point ($D_p$).

In some examples, the dew point ($D_p$) may be determined by measuring air temperature and humidity in the power converter. This can be done in or around the power converter. In further examples, the warm-up period may be zero for coolant temperatures ($T_c$) higher than a predetermined coolant temperature threshold ($T_{th}$). The predetermined coolant temperature threshold ($T_{th}$) may be approximately 25 degrees Celsius, but other temperatures may be selected depending on atmospheric conditions or on the nature and arrangement of electronic components inside the power converter.

Additionally, in method 300 a second indicator indicative for the warm-up period is determined based on the difference between the coolant temperature ($T_c$) and the estimated dew point ($D_p$). Besides, the warm-up period may be selectively based on the first indicator or the second indicator.

Further, the first value ($V_1$) for the warm-up period may be based on the first indicator and a second value ($V_2$) for the warm-up period may be based on the second indicator. Thus, the warm-up period may be selected as the lowest of the first and second values ($V_1$, $V_2$).

Further, the second value ($V_2$) for the warm-up period may decrease linearly as a function of a difference in temperature between the coolant temperature ($T_c$) and the dew point ($D_p$).

Figure 4:
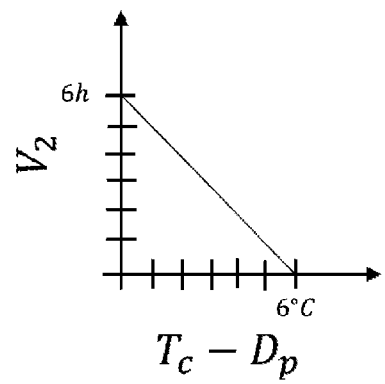
FIG. 4 shows a second value of a period for warming up as a function of coolant to dew point temperature difference according to one example.

FIG. 4 shows an example of the linear relation that may exist between the second value ($V_2$) and the difference in temperature previously discussed. Thus, when the difference between coolant temperature ($T_c$) and dew point ($D_p$) is greater than 6 degrees the second value ($V_2$) for the warm-up period may be zero. The 6 degrees difference represent an exemplary temperature threshold, but greater or smaller temperature differences may be selected as a temperature threshold. On the other hand, when the difference between the coolant temperature ($T_c$) and dew point ($D_p$) is nearly zero, the second value ($V_2$) for the warm-up period may be 6 hours. As discussed in relation to the predetermined coolant temperature threshold ($T_{th}$), certain specifications of the power converter components may require a different relation between temperature difference and the period for warming up. Thus, the relation shown in FIG. 4 may be shifted upwards or downwards, may have a different slope or may be defined by a function different than a first order polynomial.

Further, in some examples, the temperature and humidity may be measured at a plurality of locations inside or around the power converter. In this case, the determination of the second value ($V_2$) for the warm-up period may be based on the smallest difference between coolant temperature ($T_c$) and dew point ($D_p$).

Figure 5:
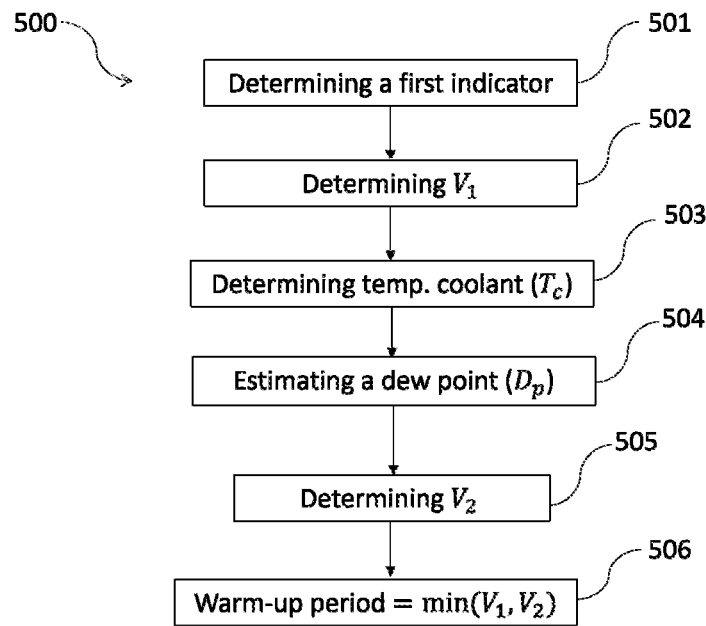
FIG. 5 is a flow diagram of another example method for determining a duration of a period for warming up a power converter.

FIG. 5 is a flow diagram of another example of a method 500 to determine a period for warming up of a power converter of a wind turbine, after a grid outage period. In particular, FIG. 5 shows that the method 500 comprises, at block 501, determining a first indicator indicative of a time that the power converter has been inactive. Further, the method 500 also comprises, at block 502, determining a first value ($V_1$) for the warm-up period at least partially based on the first indicator. Additionally, the method also comprises, at block 503, determining a temperature of a coolant ($T_c$) of the power converter. Further, the method 500 comprises, at block 504, estimating a dew point ($D_p$) and, in block 505, determining a second value ($V_2$) for the warm-up period based on a difference between the coolant temperature ($T_c$) and the dew point ($D_p$). Then, at block 506, the duration of the warm-up period is selected as a minimum value of the first ($V_1$) and second ($V_2$) value for the warm-up period.

In some examples, the method 500 may comprise assigning a zero value to the second value ($V_2$) for the warm-up period if the coolant temperature ($T_c$) is above the predetermined coolant temperature threshold ($T_{th}$).

In another aspect, a power converter assembly configured to determine a duration of a warm-up period is disclosed. The power converter assembly comprises a processor configure to determine a first indicator (301) indicative of a time that the power converter has been inactive. Further, the processor is configured to determine the warm-up period at least partially based on the first indicator.

Further, the power converter assembly may comprise a temperature sensor configured to measure a temperature ($T_c$) of a coolant of the power converter, a temperature sensor configured to measure an air temperature in or around the power converter, and a humidity sensor configured to measure air humidity in or around of the power converter. A selection from the previously disclosed sensors may be alternatively included. Additionally, the processor may be configured to estimate a dew point ($D_p$) based on the measured air temperature and humidity to determine the warm-up period at least partially based also on the difference between the coolant temperature ($T_c$) and the dew point ($D_p$).

In additional examples, the warm-up period may also be based on an absolute magnitude of the coolant temperature ($T_c$). Further, the processor may be configured to select the warm-up duration period as a minimum value between the first value ($V_1$) and the second value for the warm-up period.

The power converter assembly may be configured to perform any of the steps included in any of the examples of the methods disclosed, and may comprise additional devices to perform the same when needed.

This written description uses examples to disclose the present teaching, including the preferred embodiments, and also to enable any person skilled in the art to practice it, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for determining a period for warming up a power converter of a wind turbine, the method comprising:

with a processor configured with the power converter, performing the following:
  determining a first indicator for the period for warming up, the first indicator indicative of a time that the power converter has been inactive;
  determining a second indicator for the period for warming up by:
    determining a temperature of a coolant used in a cooling system configured with the power converter;
    estimating a dew point;
    determining a difference between the estimated dew point and the coolant temperature;
  determining the period for warming up at least partially based on the first indicator or at least partially based on the second indicator.

2. The method of claim 1, wherein the first indicator is determined based on a time when the cooling system configured with the power converter has been inactive.

3. The method of claim 1, wherein the wind turbine is in a grid outage period and the first indicator is determined based on a period of time between a point in time wherein an auxiliary generator has been turned on and a point in time wherein the wind turbine is connected back to a grid.

4. The method of claim 1, wherein the wind turbine is in a grid outage period and the first indicator is determined by comparing a timestamp of a grid outage start with a timestamp of a grid outage end.

5. The method of claim 1, wherein the period for warming up is set at zero time for coolant temperatures higher than a predetermined coolant temperature threshold.

6. The method of claim 1, wherein the dew point is determined by measuring air temperature and humidity in or around the power converter.

7. The method of claim 1, wherein a first value for the period for warming up is based on the first indicator and a second value for the period for warming up is based on the second indicator, and wherein the period for warming up is selected as the lowest of the first and second values.

8. The method of claim 7, wherein the first value for the period for warming up is determined from a plurality of discrete values based on the first indicator.

9. The method of claim 7, wherein the first value for the period for warming up is zero time when the first indicator is below a minimum threshold.

10. The method of claim 7, wherein the second value for the period for warming up linearly decreases as a function of the difference in temperature between the coolant temperature and the estimated dew point.

11. The method of claim 7, wherein the second value for the period for warming up is zero time when the difference in temperature is greater than a temperature difference threshold.

12. The method of claim 7, wherein temperature and humidity are measured at a plurality of locations in the power converter to determine a plurality of estimated dew points, and the second value for the period for warming up is based on a smallest difference between coolant temperature and the plurality of estimated dew points.

13. The method of claim 1, further comprising warming up the power converter of the wind turbine by passing a warm liquid through the power converter for the determined warming up period.

14. A method for determining a period for warming up of a power converter of a wind turbine after a grid outage period, the method comprising:
  with a processor configured with the power converter, performing the following:
    determining a temperature of a coolant used in the power converter;
    estimating a dew point; and determining a value for the period for warming up at least partially based on a difference between the coolant temperature and the dew point.

15. The method of claim 14, wherein the value for the period for warming depends also on an absolute value of the temperature of the coolant.

16. A power converter assembly configured to determine a period for warming up, the power converter comprising:
  a processor configured to determine a first indicator of a time the power converter has been inactive;
  a temperature sensor configured to measure a temperature of a coolant used in the power converter;
  a temperature sensor configured to measure an air temperature;
  a humidity sensor configured to measure an air humidity;
  the processor further configured to estimate a dew point based on the air temperature and air humidity; and
  the processor further configured to determine the period for warming up at least partially based on the first indicator or at least partially based on a difference between the temperature of the coolant and the dew point.

17. A power converter assembly configured to determine a period for warming up, the power converter comprising:
  a processor;
  a temperature sensor configured to measure a temperature of a coolant used in the power converter;
  a temperature sensor configured to measure an air temperature;
  a humidity sensor configured to measure an air humidity;
  the processor further configured to estimate a dew point based on the air temperature and air humidity; and
  the processor further configured to determine the period for warming up at least partially based on a difference between the temperature of the coolant and the dew point.

* * * * *